(12) United States Patent
Rinne et al.

(10) Patent No.: US 10,454,629 B2
(45) Date of Patent: Oct. 22, 2019

(54) METHOD AND APPARATUS FOR COVERAGE EXTENSION

(75) Inventors: Mika Petri Olavi Rinne, Espoo (FI); Kari Pekka Pajukoski, Oulu (FI); Esa Tapani Tiirola, Kempele (FI); Kari Juhani Hooli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 953 days.

(21) Appl. No.: 14/368,503

(22) PCT Filed: Dec. 30, 2011

(86) PCT No.: PCT/IB2011/056034
§ 371 (c)(1),
(2), (4) Date: Jun. 24, 2014

(87) PCT Pub. No.: WO2013/098594
PCT Pub. Date: Jul. 4, 2013

(65) Prior Publication Data
US 2014/0321418 A1    Oct. 30, 2014

(51) Int. Cl.
*H04L 1/18* (2006.01)
*H04L 1/08* (2006.01)
(Continued)

(52) U.S. Cl.
CPC .............. *H04L 1/1854* (2013.01); *H04L 1/08* (2013.01); *H04L 1/189* (2013.01); *H04L 1/1812* (2013.01);
(Continued)

(58) Field of Classification Search
None
See application file for complete search history.

(56) References Cited

U.S. PATENT DOCUMENTS

2009/0307554 A1* 12/2009 Marinier ............... H04L 1/1812
    714/748
2010/0034158 A1*  2/2010 Meylan ................. H04L 1/1854
    370/329
(Continued)

FOREIGN PATENT DOCUMENTS

| CN | 101651528 A | 2/2010 |
| CN | 101753280 A | 6/2010 |

(Continued)

OTHER PUBLICATIONS

International Search Report and Written Opinion received for corresponding Patent Cooperation Treaty Application No. PCT/IB2011/056034, dated Feb. 15, 2013, 13 pages.
(Continued)

*Primary Examiner* — Ajit Patel
(74) *Attorney, Agent, or Firm* — Mintz Levin Cohn Ferris Glovsky and Popeo, P.C.

(57) ABSTRACT

Various methods are described coverage enhancement of delay limited services according to an example embodiment. One example method may comprise generating one or more transport blocks. In some example embodiments, the transport blocks are configured to contain a data payload replica. The method of this embodiment may also include causing the one or more transport blocks to be transmitted via parallel hybrid automatic repeat request (HARQ) processes. In some example embodiments, the one or more transport blocks are transmitted based on a limited number of transmissions. The method of this embodiment may also include causing transmission of the one or more transport blocks in an instance in which an allocation does not include a new data indicator and which includes a same transport block size and transport block format for the data payload replica.

15 Claims, 12 Drawing Sheets

(51) Int. Cl.
  *H04L 1/16* (2006.01)
  *H04W 28/02* (2009.01)
  *H04W 72/04* (2009.01)
(52) U.S. Cl.
  CPC ......... *H04L 1/1822* (2013.01); *H04L 1/1845* (2013.01); *H04L 1/1896* (2013.01); *H04W 28/0278* (2013.01); *H04W 72/042* (2013.01); *H04L 1/1607* (2013.01)

(56) References Cited

U.S. PATENT DOCUMENTS

| | | | | |
|---|---|---|---|---|
| 2010/0192035 | A1* | 7/2010 | Sagfors | H04L 1/1819 714/748 |
| 2011/0038352 | A1 | 2/2011 | Bergman et al. | |
| 2011/0141952 | A1 | 6/2011 | Wang et al. | |
| 2011/0141991 | A1 | 6/2011 | Gao | |
| 2011/0280212 | A1 | 11/2011 | Lv | |
| 2012/0057560 | A1 | 3/2012 | Park et al. | |
| 2012/0147830 | A1* | 6/2012 | Lohr | H04W 72/042 370/329 |

FOREIGN PATENT DOCUMENTS

| | | |
|---|---|---|
| CN | 101795183 A | 8/2010 |
| EP | 2200209 | 6/2010 |
| EP | 2265077 A1 | 12/2010 |
| EP | 2279577 A1 | 2/2011 |
| EP | 2383923 A1 | 11/2011 |
| KR | 2010-0122054 A | 11/2010 |
| TW | 2009-47939 A | 11/2009 |
| WO | 2009/123549 A2 | 10/2009 |
| WO | 2009/126902 A2 | 10/2009 |
| WO | 2009/132236 A2 | 10/2009 |
| WO | 2009131509 | 10/2009 |
| WO | 2010/019621 A2 | 2/2010 |

OTHER PUBLICATIONS

Susitaival, R. et al. "LTE Coverage Improvement by TTI Bundling", Vehicular Technology Conference 2009. VTC Spring 2009, IEEE 69th vol. No. pp. 1-5, Apr. 26-29, 2009.
"3rd Generation Partnership Project; Technical Specification Group Radio Access Network; Evolved Universal Terrestrial Radio Access (E-UTRA); Medium Access Control (MAC) Protocol Specification (Release 10)", 3GPP TS 36.321, v10.3.0, Sep. 2011, pp. 1-54.
Wang et al., "Performance of TTI Bundling for VoIP in EUTRAN TDD Mode", IEEE Vehicular Technology Conference, Apr. 26-29, 2009, pp. 1-5.
Office action received for corresponding Chinese Patent Application No. 201180076159.6, dated Aug. 4, 2016, 8 pages of office action and no page of office action translation available.
Extended European Search Report received for corresponding European Patent Application No. 11878808.2, dated Jan. 14, 2016, 13 pages.
Office action received for corresponding Chinese Patent Application No. 201180076159.6, dated Mar. 27, 2017, 3 pages of office action and no page of office action translation available.

* cited by examiner

METHOD AND APPARATUS FOR COVERAGE EXTENSION

RELATED APPLICATION

This application was originally filed as PCT Application No. PCT/IB2011/056034 filed Dec. 30, 2011.

TECHNICAL FIELD

Embodiments of the present invention relate generally to communication technology, and, more particularly, relate to a method and apparatus for uplink coverage enhancement.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, for example, improvements are being made to the universal mobile telecommunications system (UMTS) terrestrial radio access network (UTRAN). Further, for example, the evolved-UTRAN (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

A constant goal for LTE and indeed any operating communications network is to improve coverage. In particular, one area for improved coverage is the area of delay limited services like machine type communications (MTC) and voice over internet protocol (VoIP). For example in LTE release 8, transmission time interval (TTI) bundling was introduced to improve coverage. However, TTI bundling lengthens the retransmission cycle and therefore imposes some limitations for delay limited services.

By way of example, a TTI is a timing parameter related to encapsulation of data from higher layers into frames for transmission on the radio link layer. TTI refers to the duration of a transmission on the radio link which may be used for hybrid automatic repeat request (HARQ).

SUMMARY

Methods, apparatuses, and computer program products are herein provided for coverage enhancement of delay limited services. In some example embodiments, coverage enhancement may be accomplished by combining transport block replicas across example parallel HARQ processes within a delay-constrained or delay-limited packet transmission (e.g. packetized voice (VoIP), messaging, chat, emergency messages, Emergency and Tsunami Warning System, (ETWS) messages, gaming, public safety messages or video). The example HARQ processes may also apply with other coverage extension mechanisms (e.g. TTI bundling).

In particular, an access point may be configured to dynamically allocate parallel HARQ processes for a transport block. Based on the allocation, a mobile terminal may continually transmit data packets (e.g. VoIP packets) in the transport blocks via the parallel HARQ processes. The access point may receive the transport blocks, via the parallel HARQ processes, and may decode the data payload from consecutive TTI bundles of the same HARQ process. Further the access point may combine the transport blocks from the parallel HARQ processes, across the HARQ-processes and decode the data payload from transmissions across the HARQ-processes.

In one embodiment, a method is provided that comprises generating one or more transport blocks. In some example embodiments, the transport blocks are configured to contain a data payload replica. The method of this embodiment may also include causing the one or more transport blocks to be transmitted via parallel hybrid automatic repeat request (HARQ) processes. In some example embodiments, the one or more transport blocks are transmitted based on a limited number of transmissions. The method of this embodiment may also include causing transmission of the one or more transport blocks in an instance in which an allocation does not include a new data indicator and which includes a same transport block size and transport block format for the data payload replica.

In another embodiment, an apparatus is provided that includes at least one processor and at least one memory including computer program code with the at least one memory and the computer program code being configured, with the at least one processor, to cause the apparatus to at least generate one or more transport blocks. In some example embodiments, the transport blocks are configured to contain a data payload replica. The at least one memory and computer program code may also be configured to, with the at least one processor, cause the apparatus to cause the one or more transport blocks to be transmitted via parallel hybrid automatic repeat request (HARQ) processes. In some example embodiments, the one or more transport blocks are transmitted based on a limited number of transmissions. The at least one memory and computer program code may also be configured to, with the at least one processor, cause the apparatus to cause transmission of the one or more transport blocks in an instance in which an allocation does not include a new data indicator and which include a same transport block size and transport block format for the data payload replica.

In the further embodiment, a computer program product may be provided that includes at least one non-transitory computer-readable storage medium having computer-readable program instruction stored therein with the computer-readable program instructions including program instructions configured to generate one or more transport blocks. In some example embodiments, the transport blocks are configured to contain a data payload replica. The computer-readable program instructions may also include program instructions configured to cause the one or more transport blocks to be transmitted via parallel hybrid automatic repeat request (HARQ) processes. In some example embodiments, the one or more transport blocks are transmitted based on a limited number of transmissions. The computer-readable program instructions may also include program instructions configured to cause transmission of the one or more transport blocks in an instance in which an allocation does not include a new data indicator and which include a same transport block size and transport block format for the data payload replica.

In yet another embodiment, an apparatus is provided that includes means for generating one or more transport blocks. In some example embodiments, the transport blocks are configured to contain a data payload replica. The apparatus of this embodiment may also include means for causing the one or more transport blocks to be transmitted via parallel hybrid automatic repeat request (HARQ) processes. In some example embodiments, the one or more transport blocks are transmitted based on a limited number of transmissions. The apparatus of this embodiment may also include means for causing transmission of the one or more transport blocks in an instance in which an allocation does not include a new data indicator and which includes a same transport block size and transport block format for the data payload replica.

In one embodiment, a method is provided that comprises at least one of combining and decoding one or more transport blocks from consecutive TTI bundles of a same HARQ-process. The method of this embodiment may also include combining the one or more transport blocks from at least any of a plurality of parallel HARQ processes in an instance in which the one or more transport blocks from consecutive TTI bundles of the same HARQ process were not successfully decoded. The method of this embodiment may also include decoding the combined one or more transport blocks from at least one of the plurality of parallel HARQ processes. The method of this embodiment may also include causing feedback to be sent to a communications device.

In another embodiment, an apparatus is provided that includes at least one processor and at least one memory including computer program code with the at least one memory and the computer program code being configured, with the at least one processor, to cause the apparatus to at least at least one of combine or decode one or more transport blocks from consecutive TTI bundles of a same HARQ process. The at least one memory and computer program code may also be configured to, with the at least one processor, cause the apparatus to combine the one or more transport blocks from each of a plurality of parallel HARQ processes in an instance in which the one or more transport blocks from consecutive TTI bundles of the same HARQ process were not successfully decoded. The at least one memory and computer program code may also be configured to, with the at least one processor, cause the apparatus to decode the one or more transport blocks from at least one of the plurality of parallel HARQ processes. The at least one memory and computer program code may also be configured to, with the at least one processor, cause the apparatus to cause feedback to be sent to a communications device.

In the further embodiment, a computer program product may be provided that includes at least one non-transitory computer-readable storage medium having computer-readable program instruction stored therein with the computer-readable program instructions including program instructions configured to at least one of combine or decode one or more transport blocks from consecutive TTI bundles of a same HARQ process. The computer-readable program instructions may also include program instructions configured to combine the one or more transport blocks from each of a plurality of parallel HARQ processes in an instance in which the one or more transport blocks from consecutive TTI bundles of the same HARQ process were not successfully decoded. The computer-readable program instructions may also include program instructions configured to decode the one or more transport blocks from at least one of the plurality of parallel HARQ processes. The computer-readable program instructions may also include program instructions configured to cause feedback to be sent to a communications device.

In yet another embodiment, an apparatus is provided that includes means for at least one of combining and decoding one or more transport blocks from consecutive TTI bundles of a same HARQ-process. The apparatus of this embodiment may also include means for combining the one or more transport blocks from at least any of a plurality of parallel HARQ processes in an instance in which the one or more transport blocks from consecutive TTI bundles of the same HARQ process were not successfully decoded. The apparatus of this embodiment may also include means for decoding the combined one or more transport blocks from at least one of the plurality of parallel HARQ processes. The apparatus of this embodiment may also include means for causing feedback to be sent to a communications device.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

Figure 10:
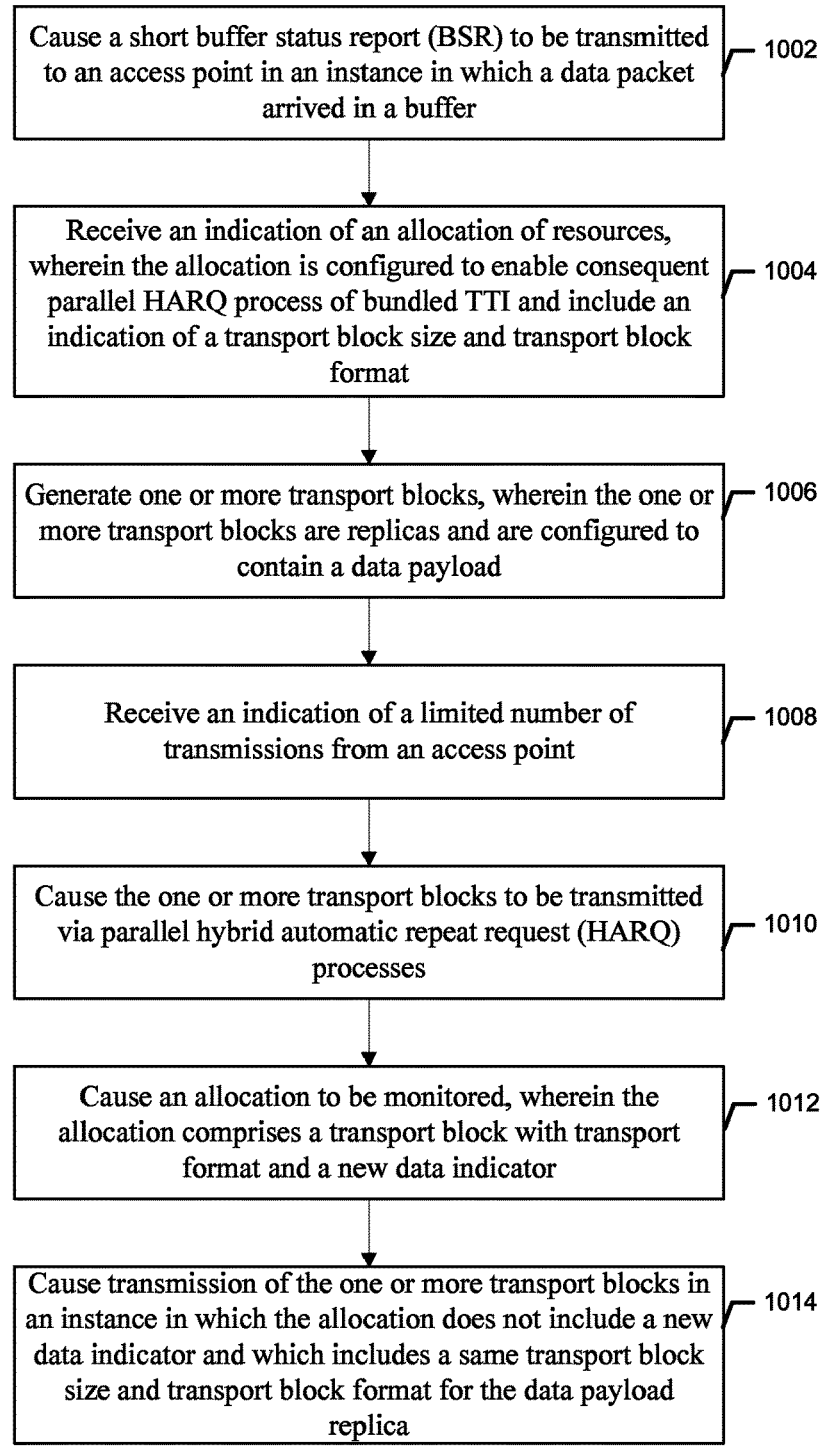
Figure 11:
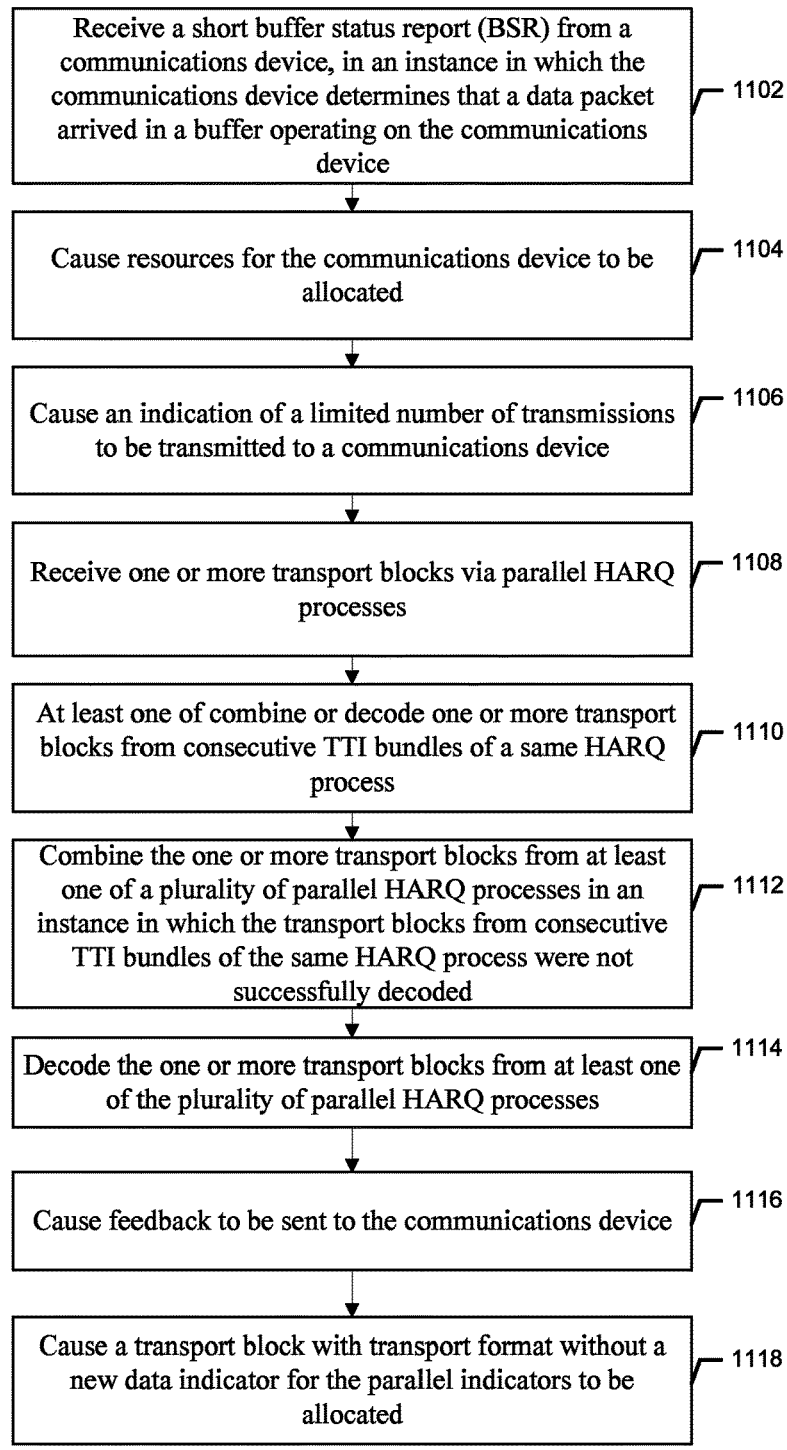

FIG. 10 illustrates a flowchart according to an example method configured to be executed by executed by a communications device for coverage enhancement of delay limited services according to some example embodiments of the current invention; and FIG. 11 illustrates a flowchart according to an example method configured to be executed by an access point for coverage enhancement of delay limited services according to some example embodiments of the current invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

Figure 1:
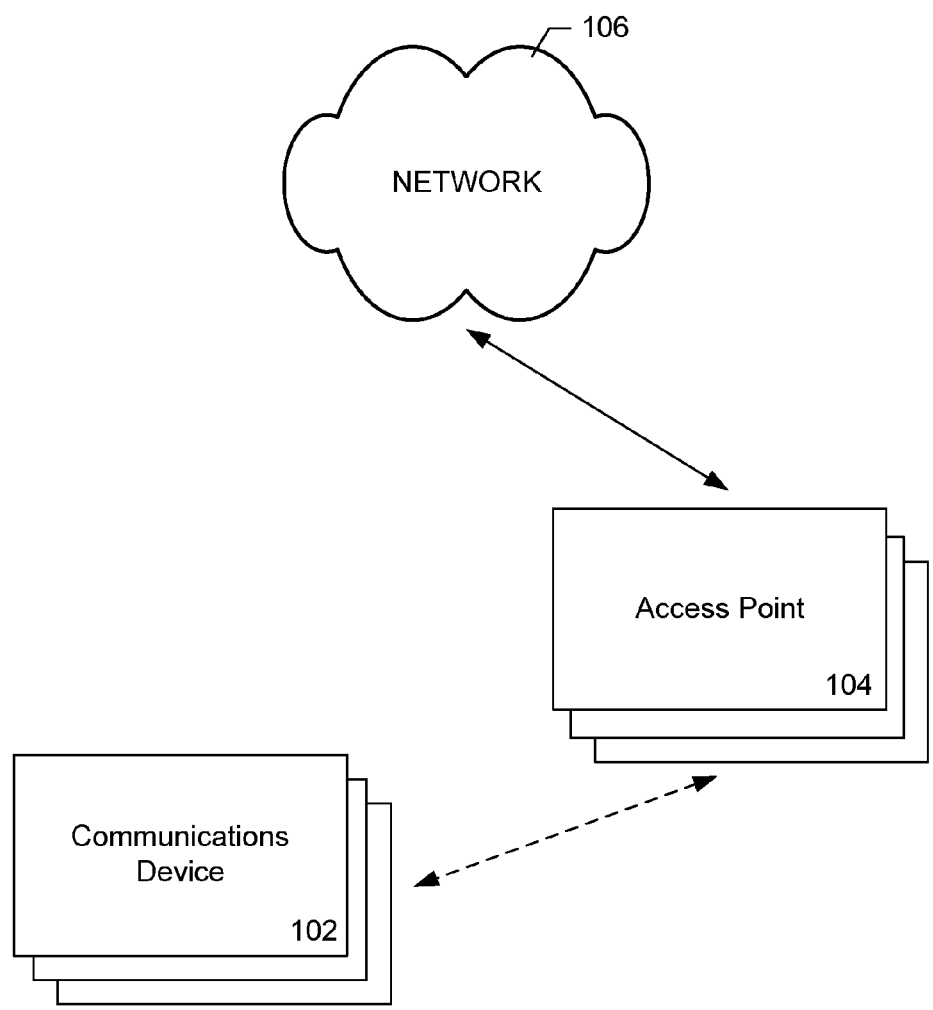
FIG. 1 illustrates a block diagram of a system 100 for coverage enhancement of delay limited services according to some example embodiments of the current invention.

Referring now to FIG. 1, FIG. 1 illustrates a block diagram of a system 100 for coverage enhancement of delay limited services according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for selecting an access method for coverage enhancement of delay limited services; numerous other configurations may also be used to implement embodiments of the present invention.

The system 100 may include one or more communications devices 102 and one or more access points 104. The system 100 may further comprise a network 106. The network 106 may comprise one or more wireline networks, one or more wireless networks, or some combination thereof. The network 106 may, for example, comprise a serving network (e.g., a serving cellular network) for one or more communications devices 102. The network 106 may comprise, in certain embodiments, one or more of the communications devices 102 and access points 104 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more communications devices 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications-Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more communications devices 102 may be configured to connect directly with one or more access points 104 via, for example, an air interface without routing communications via one or more elements of the network 106. Alternatively, one or more of the communications devices 102 may be configured to communicate with one or more of the access points 104 over the network 106. In this regard, the access points 104 may comprise one or more nodes of the network 106. For example, in some example embodiments, the access points 104 may be at least partially embodied on one or more computing devices that comprise an element of a radio access network (RAN) portion of the network 106. In this regard, the access points 104 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the communications devices 102. In some embodiments, the access points 104 may comprise an Access Network Discovery and Selection Function (ANDSF), and/or the like. Accordingly, each of the access points 104 may comprise a network node or a plurality of network nodes collectively configured to perform one or more operations attributed to the access point 104 as described with respect to various example embodiments disclosed herein.

A communications device 102 may be embodied as any computing device, such as, for example, a desktop computer, laptop computer, mobile terminal, mobile computer, mobile phone, smartphone, mobile communication device, tablet computing device, pad, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

Figure 2:
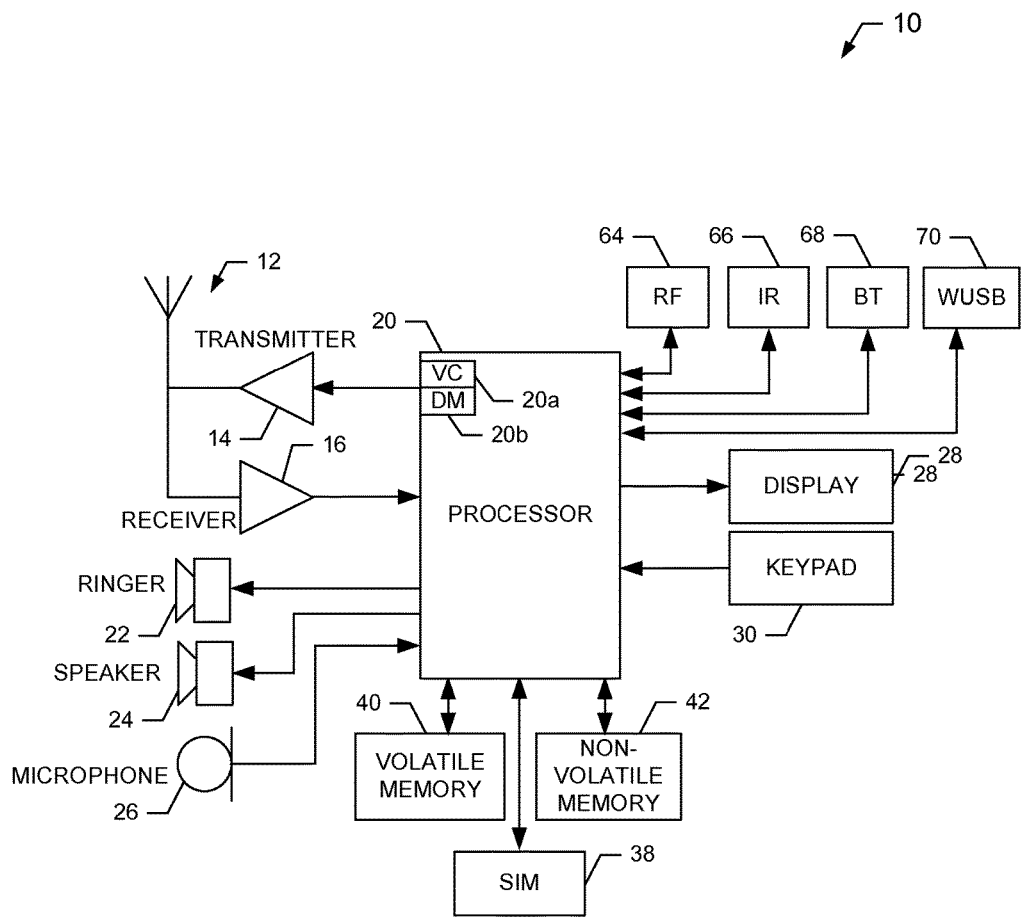
FIG. 2 illustrates a block diagram of a mobile terminal 10 representative of one embodiment of a communications device 102.

In some example embodiments, a communications device 102 may be embodied as an example mobile terminal, such as that illustrated in FIG. 2. In this regard, FIG. 2 illustrates a block diagram of a mobile terminal 10 representative of one embodiment of a communications device 102. It should be understood, however, that the mobile terminal 10 illustrated and hereinafter described is merely illustrative of one type of computing device (i.e., communications device 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various mobile communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future. The mobile terminal may be capable in operating with various IEEE and IETF standards, for example IEEE 802.11 standard for wireless fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
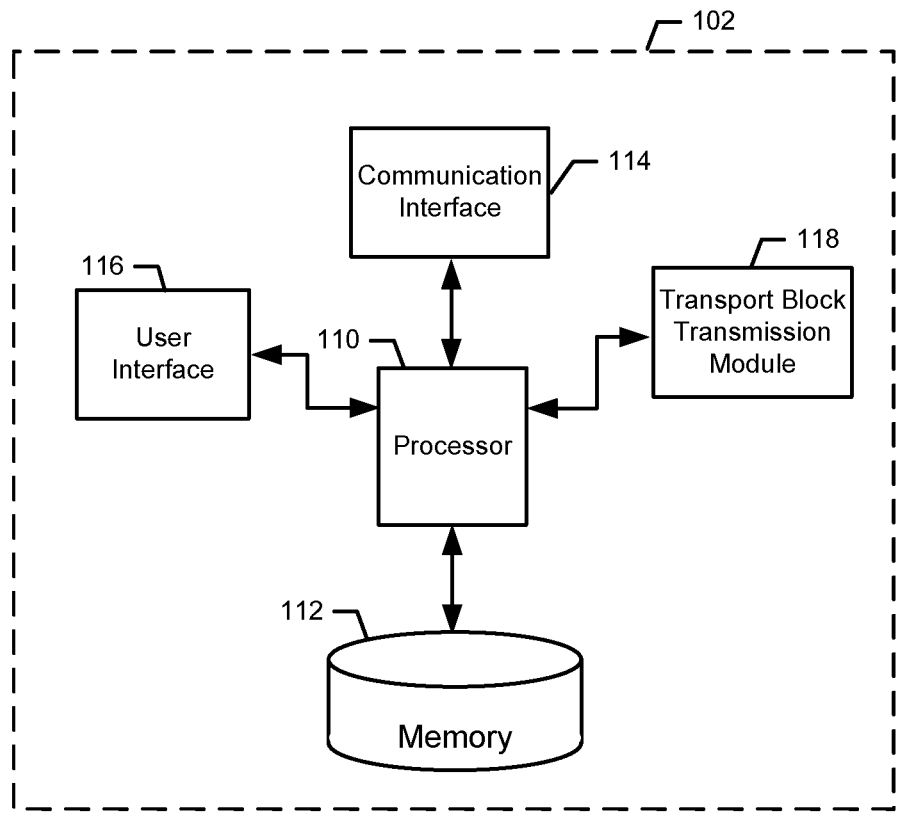
FIG. 3 illustrates a block diagram of a communications device 102 according to some example embodiments of the current invention.

Referring now to FIG. 3, FIG. 3 illustrates a block diagram of a communications device 102 according to an example embodiment. In the example embodiment, the communications device 102 may comprise various means for performing the various functions herein described. These means may comprise one or more of a processor 110, memory 112, communication interface 114, user interface 116, or transport block transmission module 118. The means of the communications device 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the communications device 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or transport block transmission module 118 may be embodied as a chip or chip set. The communications device 102 may therefore, in some example embodiments, be configured to implement embodiments of the present invention on a single chip or as a single "system on a chip." As another example, in some example embodiments, the communications device 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the communications device 102 as described herein. The plurality of processors may be embodied on a single computing device or distributed across a plurality of computing devices collectively configured to function as the communications device 102. In embodiments wherein the communications device 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the communications device 102 to perform one or more of the functionalities of the communications device 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the communications device 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the communications device 102 is embodied as a mobile terminal 10, the memory 112 may comprise the volatile memory 40 and/or the non-volatile memory 42. The memory 112 may be configured to store information, data, applications, instructions, or the like for enabling the communications device 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the transport block transmission module 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the communications device 102 and one or more computing devices or computing resources may be in communication. As an example, the communication interface 114 may be configured to enable communication between the communications device 102 and another device, such as another communications device 102. As a further example, the communication interface 114 may be configured to enable communication with a access point 104 via the network 106. The communication interface 114 may additionally be in communication with the memory 112, user interface 116, and/or transport block transmission module 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or transport block transmission module 118, such as via a bus.

The transport block transmission module 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the transport block transmission module 118 is embodied separately from the processor 110, the transport block transmission module 118 may be in communication with the processor 110. The transport block transmission module 118 may further be in communication with one or more of the memory 112, communication interface 114, or user interface 116, such as via a bus.

Figure 4:
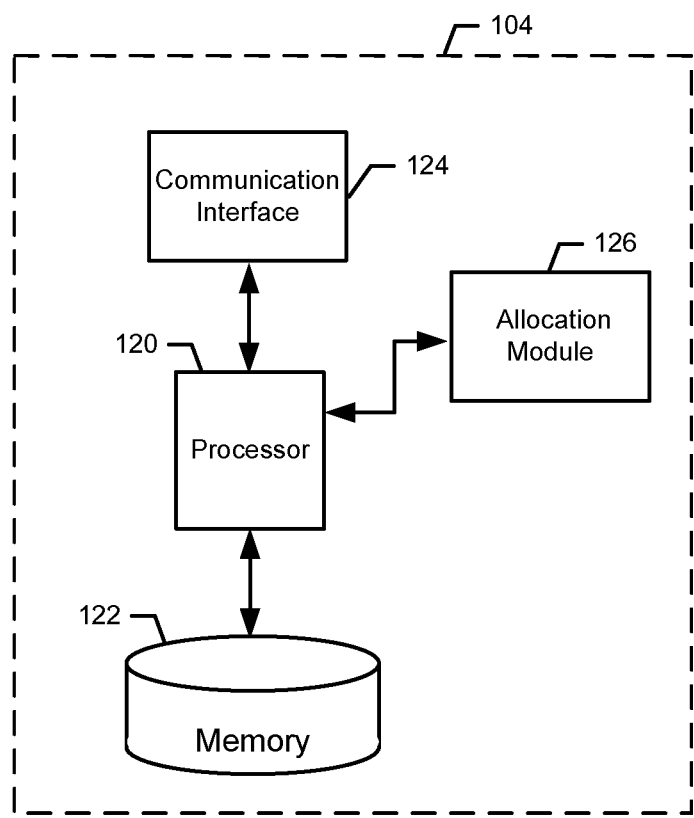
FIG. 4 illustrates a block diagram of an access point 104 according to some example embodiments of the current invention.

Referring now to FIG. 4, FIG. 4 illustrates a block diagram of an access point 104 according to an example embodiment. In the example embodiment, the access point 104 may comprise various means for performing the various functions herein described. These means may comprise one or more of a processor 120, memory 122, communication interface 124, or allocation module 126. The means of the access point 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 122) that is executable by a suitably configured processing device (e.g., the processor 120), or some combination thereof.

In some example embodiments, one or more of the means illustrated in FIG. 4 may be embodied as a chip or chip set. In other words, the access point 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, and/or allocation module 126 may be embodied as a chip or chip set. The access point 104 may therefore, in some example embodiments, be configured to implement embodiments of the present invention on a single chip or as a single "system on a chip." As another example, in some example embodiments, the access point 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 120 may comprise a plurality of processors. The plurality of processors may be in operative communication with each other and may be collectively configured to perform one or more functionalities of the access point 104 as described herein. The plurality of processors may be embodied on a single computing device or distributed across a plurality of computing devices collectively configured to function as the access point 104. In some example embodi-ments, the processor 120 may be configured to execute instructions stored in the memory 122 or otherwise accessible to the processor 120. These instructions, when executed by the processor 120, may cause the access point 104 to perform one or more of the functionalities of the access point 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the access point 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the access point 104 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the allocation module 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the access point 104 and one or more computing devices or computing resources may be in communication. As an example, the communication interface 124 may be configured to enable communication with a communications device 102 by the network 106, a radio uplink, and/or the like. The communication interface 124 may additionally be in communication with the memory 122, and/or allocation module 126, such as via a bus.

The allocation module 126 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the allocation module 126 may be embodied separately from the processor 120, the allocation module 126 may be in communication with the processor 120. The allocation module 126 may further be in communication with one or more of the memory 122 or communication interface 124, such as via a bus.

In some example embodiments, the access point 104 of FIG. 4, such as by the processor 120, the communications interface 124, the allocation module 126 or the like may be configured to determine that network coverage is limited (e.g. at a cell edge, etc.) for a communications device 102 and therefore the access point 104 may cause a signal to be transmitted to the communications device. In some example embodiments, the signal may indicate that the communications device 102 is to use a coverage extension mechanism, such as TTI bundling. Alternatively or additionally, the allocation may cause the signal to be transmitted in other situations such as interference, detected data packet loss and/or the like.

In some example embodiments, the communications device 102 of FIG. 3, such as by the processor 110, the communications interface 114, the transport block transmission module 118 or the like, may monitor a buffer, such as a buffer in the memory 112, to determine whether there is one or more data packets (e.g. VoIP) waiting for transmission. In an instance in which there is a data packet for transmission, the communications device 102, such as by the processor 110, the communications interface 114, the transport block transmission module 118 or the like, may cause a buffer status report (BSR) to be transmitted to the access point 104. In some example embodiments, the BSR may take the form of a short BSR, in other embodiments it may take the form of a long BSR. In some example embodiments the data may be transmitted without any form of BSR present in the payload. The presence of BSR, and the form of BSR if present, may change for any new instance of data. In some embodiments of the invention, a form of BSR may be transmitted without any other data present in the payload.

In some example embodiments, the access point 104 of FIG. 4, such as by the processor 120, the communications interface 124, the allocation module 126 or the like may allocate resources for the communications device 102 via the Physical Downlink Control Channel (PDCCH)/Physical HARQ Indicator Channel (PHICH) to enable consecutive parallel HARQ processes of bundled TTIs. In the case of PHICH-triggered retransmission (related to Physical Uplink Shared Channel (PUSCH) on parallel HARQ process) the access point 104 may be configured to transmit Negative acknowledgement (NACK) on PHICH at predetermined time but prior to the start of the transmissions on parallel HARQ processes. In other words, NACK could be seen as an additional functionality and may further complement PHICH signaling related to TTI bundling. Alternatively or additionally, NACK on PHICH can be seen as a trigger related to the parallel HARQ processes, whereas Acknowledgement (ACK) on PHICH may be configured to indicate that retransmission on parallel HARQ processes is not needed for the current transport block.

For example, the use of PDCCH may be reliable, because it includes channel coding and error detection coding. The use of PDCCH and PHICH may be beneficial channels as they are configured to be switched ON/OFF immediately per need at each transmission event. The PHICH additionally, for example, has the additional benefit that its processing time can be set to a minimum, as it only requires signal (ACK/NACK) sequence detection without decoding.

Figure 5A:
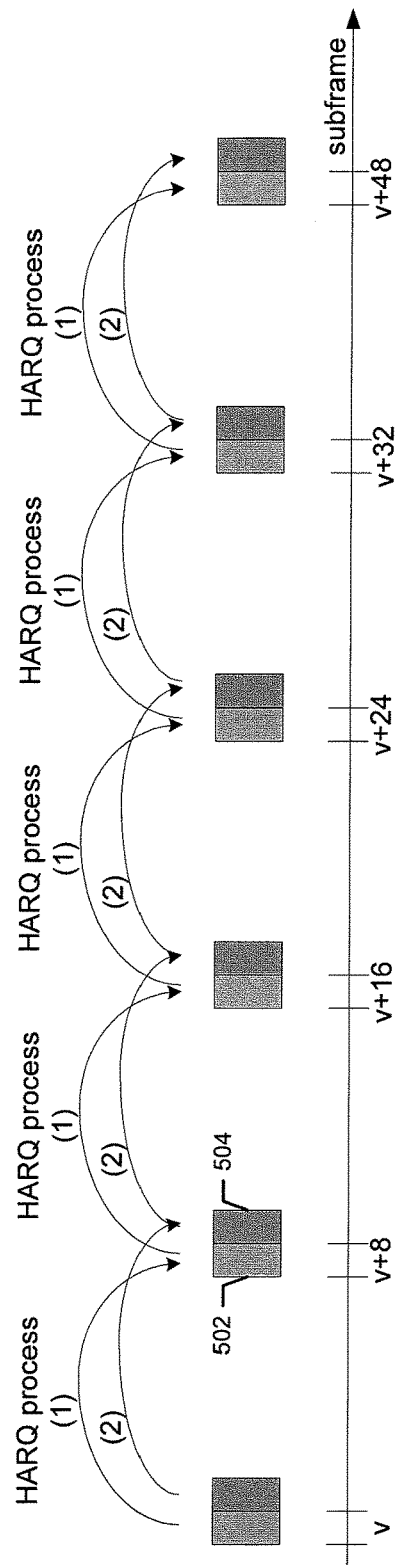
FIG. 5a illustrates example of two parallel HARQ processes for LTE uplink according to some example embodiments of the current invention.

Further example embodiments of HARQ processes for LTE uplink are shown with reference to FIG. 5a. As is described herein, HARQ is a synchronous Stop-and-Wait (SAW) process. In some example embodiments, the time-distance of events of the same process is set to eight subframes in order to allow processing time for the communications device 102 and for the access point 104. Other embodiments of the SAW processes according to some example embodiments of the current invention may be based on asynchronous processes, where the occurrences of the HARQ-processes are scheduled to variable time instances. For these instances of a process, occurrences may be given a minimum separation in time to allow sufficient processing time for the communications device and/or for the access point respectively. Otherwise the asynchronous SAW may enable a proper time instant to be scheduled for each process. The processing time includes but is not limited to decoding, scheduling, encoding and processing of the protocols. Also propagation delays and timing advance may be included into the process cycle. FIG. 5a shows two example parallel HARQ-processes: a first process 502 and a second process 504.

Figure 5B:
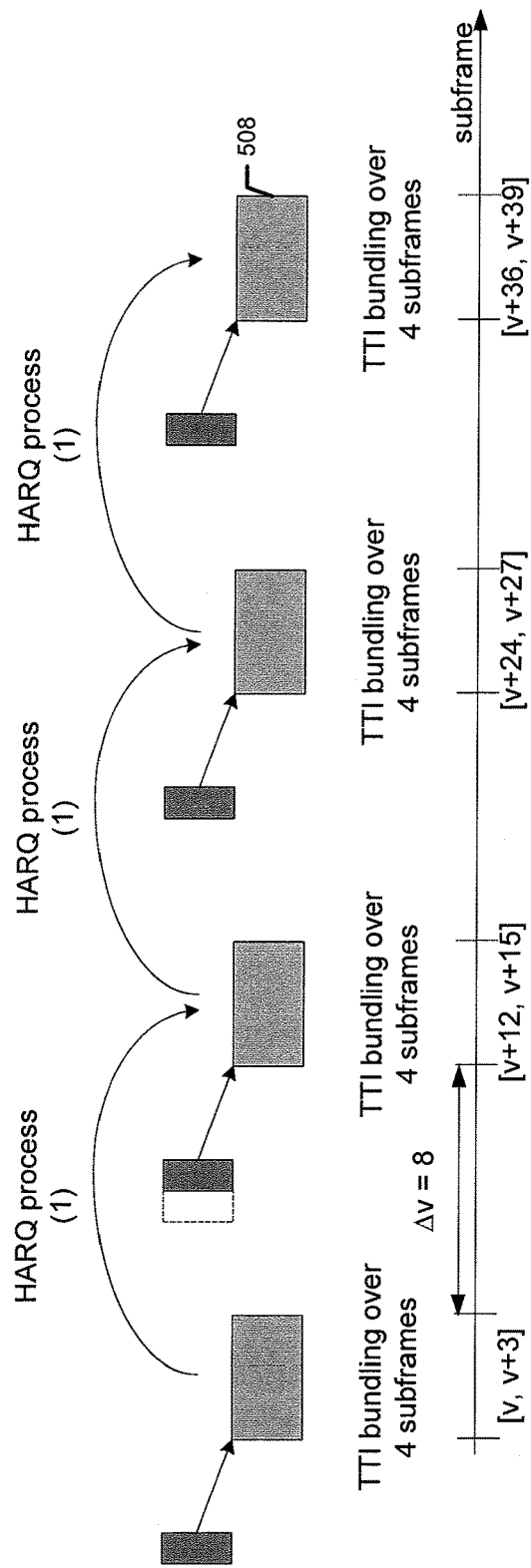
FIG. 5b illustrates example of a HARQ process in LTE uplink with example TTI-bundling according to some example embodiments of the current invention.

FIG. 5b illustrates example HARQ processes in LTE uplink with example TTI-bundling. TTI-bundling may be set for a given communications device 102 by the access point 104 via the Radio Resource Control (RRC) protocol. RRC may use any measurements or estimations of data, such as but not limited to, delay, propagation channel or interference in its decision to set TTI bundling ON or to turn it OFF. In one embodiment of the invention, a request from a communications device may trigger the action to set the TTI bundling ON or OFF respectively. In some embodiments, other communications devices may have other different HARQ-processes without TTI-bundling. The process delays for TTI-bundling may be assumed to be similar to the HARQ-processes without bundling, e.g. set to eight subframes shown with reference to FIG. 5a. FIG. 5b also illustrates the PDCCH 508. The uplink resource allocation and transport format, according to some example embodiments may be defined in the PDCCH. PDCCH allocates uplink resources beginning from the subframe offset v+4 relative to the PDCCH, according to the LTE standard. Other time offsets between the signaling and allocation are feasible according to example embodiments of the invention.

In some example embodiments, the communications device 102 of FIG. 3, such as by the processor 110, the communications interface 114, the transport block transmission module 118 or the like, may cause data packet replicas to be transmitted to parallel HARQ processes. A replica as defined herein is a same, similar or copy that closely resembles or is identical to an original in general format, size and/or contents. Further, a replica may be defined as an exact copy of information contents of one to another. The data packet replicas may be transmitted a number of times, for example up to and including a limited number of transmissions. The limited number of transmissions may be determined by the access point 104, such as by the allocation module 126, based on the Evolved Packet System (EPS) bearer delay constraint. For example, in VoIP the EPS bearer delay may typically be 50 ms. Alternatively or additionally, the limited number of transmissions of each HARQ-process is reached, when the next transport blocks with a new data payload are to be transmitted into the same HARQ-process. In some example embodiments a predefined outer coding (e.g., Walsh-Hadamard) may be applied among parallel HARQ processes.

In some example embodiments, a decision, such as by the access point 104 of FIG. 4, such as by the processor 120, the communications interface 124, the allocation module 126 or the like may be decided, enabled and/or signaled by the RRC-protocol. In this embodiment the decision, enabling and/or the signaling may include considerations on when, how and/or for which bearers or which data types the use of data payload replica transport on parallel HARQ-processes is applicable. In some example embodiments, the RRC protocol derives such definitions for allocations to be given by a scheduler until a further notice, for a period of time, for an extended period of time or for at least a plurality of time periods. In other example embodiments, the RRC protocol may also enable parallel HARQ-processes that may be used for transmission of data payload replicas and further at a time of transmission, a scheduler, such as the allocation module 126 may be configured to determine whether to expect transmission of replicas or not. The signaling may be transmitted via PDCCH for each transmission time. Yet, in another embodiment, the information whether to transmit replicas in parallel HARQ-processes may be derived from the allocation signaling or state of conditions at the time of allocation.

Alternatively or additionally, the use of parallel HARQ-processes for data payload replicas may apply for a semi-persistent scheduling. In the semi-persistent scheduling, the initial allocations for a new data payload may appear in given known resources defined by an RRC-protocol, so as to enable that signaling resources (for example on PDCCH) are not needed. Therefore, according to an embodiment of the invention, the RRC may include a definition, where it enables the use of parallel-HARQ processes for the transmission of data payload replicas in the semi-persistently allocated resources. It is notable that the retransmissions of semi-persistently allocated first resources work similar to other retransmissions, whose allocations are signaled via the PDCCH.

Figure 6:
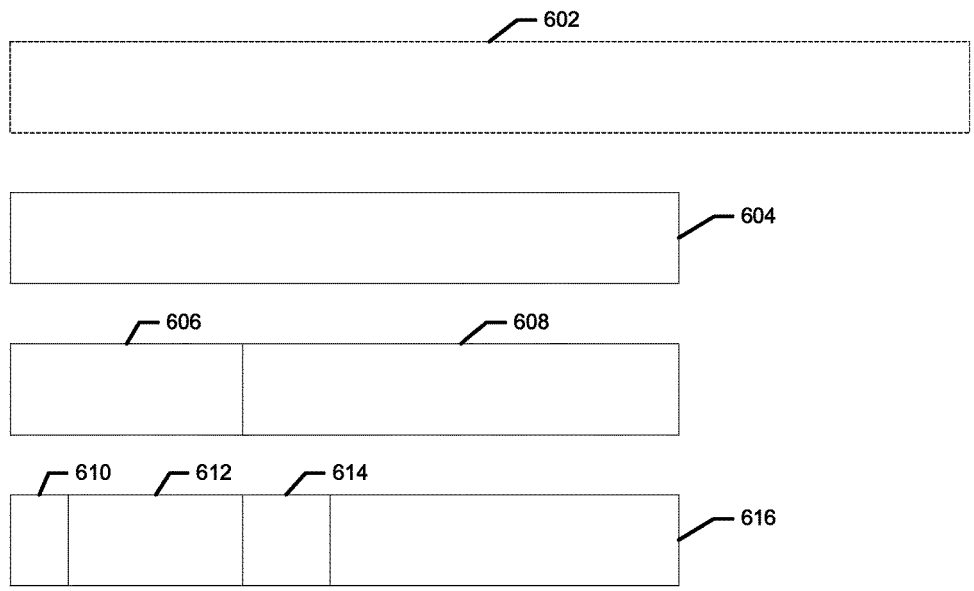
FIG. 6 illustrates an example of a data payload and a transport block according to example embodiments of the present invention.

FIG. 6 illustrates an example of a data payload and a transport block according to example embodiments of the present invention. In some example embodiments, the transport blocks for parallel HARQ-processes may be equal (e.g. they include the data packet, such as a VoIP packet 616, and a BSR 612). The format of BSR is constant as described in TS 36.321, which is incorporated by reference herein, for MAC Control Elements 606 (MAC CE). The selected BSR 612 format may either be a short BSR or a long BSR, and may be configured to be given as a replica into the parallel HARQ-processes. Alternatively or additionally, the BSR 612 need not be included in the payload. Further, a BSR alone without a data payload may be transmitted according to the embodiments of the invention. In the case of semi-persistent scheduled allocations, the first transmission of a data payload may form a data payload that fits to the semi-persistent allocated resources.

A data packet, such as a VoIP packet 616, typically includes internet protocol (IP), User Datagram Protocol (UDP), real time transmission protocol (RTP) headers and the voice coded frame (e.g. AMR frame). A Logical Channel Identity 614 (LCID) may describe the logical channel of a communications device 102 for the traffic, VoIP as shown in this example figure. The MAC PDU 608 may alternatively be a data packet of messaging service, a machine type communications unit, or a data packet may contain a transaction event, a gaming action, or an acknowledgement message of communications, TCP ACK for example. Also other embodiments of a data packet like HTTP requests, HTTP get or HTTP head may apply the means according to the embodiments of the invention. The reliable, low delay transport of TCP ACK, HTTP request, HTTP get and HTTP head messages significantly may contribute to the user experience of the performance of the wireless link. Further embodiments of critical data payload may include HTTP messages with Transport Layer Security (TLS) commonly referred to as HTTPS. In these kinds of packets, typically IP, UDP or IP, TCP network protocol headers may be present. Inside a network packet having IP, UDP or IP, TCP format, any level of higher layer protocols may be included, such as session layer, security layer, application layer protocols. A special reserved logical channel identity 610 may be assigned for the BSR, one for the short BSR, another one for the long BSR respectively. Alternatively or additionally in some example embodiments the BSR may not be used however in other cases the BSR may be configures as LTE defined Long BSR and Short BSR. In some embodiments of the invention the header fields 610 and 614 may include other protocol definitions, instead of, or in addition to the logical channel identity.

In some embodiments, even if a code block 602 includes the same Transport Block 604 that is defined by its information contents, the bit mapping of the code block 602 to the modulation symbols or the mapping of the redundancy information in the code block 602 may differ from one code block to another. In one embodiment it is also possible to include the Transport Block 604 with the first event of a process and configure retransmission events of the same HARQ-process to include incremental redundancy coding. Incremental redundancy coding allows any modification of a channel code or modification of mapping the channel coded bits to the modulation symbols between the retransmissions of code blocks, whenever the information contents of the transport blocks remain equal (e.g. replicas).

In some example embodiments, the signaling of an allocation allowing transmission of transport block replica may be indicated by a new data indicator with a dedicated value. For example, but not limited to: NDI={no new data, new data, data replica}. Alternatively or additionally, in other example embodiments, a new data indicator that is configured to identify an allocation allowing transmission of a replica may be identified separately from the NDI. For example, such as by a replica data indicator (RDI). In embodiments that comprise both an NDI and an RDI, example signaling may include but is not limited to: NDI={no new data, new data} and/or RDI={false, true}.

Alternatively or additionally, the transmission of transport block replicas may also be combined with any other signaling field suitable for this purpose, for example a redundancy version. In this example embodiment, a redundancy version bit combination would indicate an expected transmission of a transport block replica. In other example embodiments of the invention, the allocations of replica payload may be indicated by a new data indicator in a data payload and by allocating an equal size and format for the transport blocks of any of the parallel HARQ-processes. In such cases, the transmission of replicas may be expected until a new data indicator indicates the next new data payload.

In some example embodiments of the invention, the transmission of a transport block replica, when expected, may not be mandatory. In case the replica transport block is actually not transmitted in a parallel HARQ-process by the communications device, the access point may still correctly decode the payload of parallel HARQ-processes separately and resolve the data payloads to the higher layers. For example, a Sequence Numbers in higher layer protocol headers carried inside the Transport Blocks may be used to solve any duplication detection or sequence ordering of higher layer protocol data units.

In some example embodiments, the access point 104 of FIG. 4, such as by the processor 120, the communications interface 124, the allocation module 126 or the like may cause the limited number of transmissions to be transmitted to the communications device 102. This signaling may take place in a Radio Resource Control (RRC)-message or in a specific medium access control (MAC) control element, which causes the communications device 102 to be informed that the replicas of a transmission are allowed and expected from the access point 104.

Figure 7:
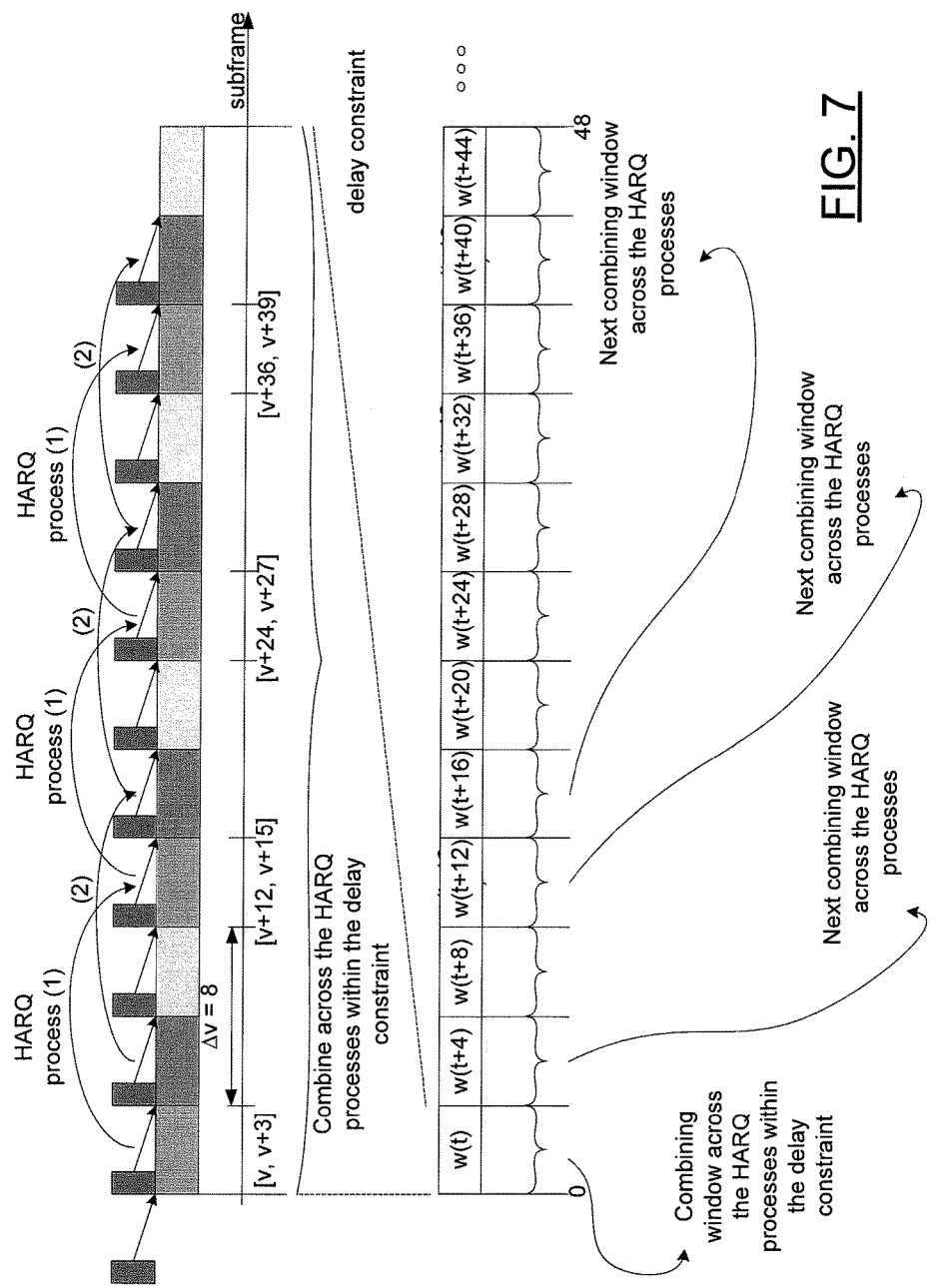
FIG. 7 illustrates example HARQ-processes in LTE uplink with TTI-bundling and combining across the HARQ-processes according to some example embodiments of the invention.

FIG. 7 illustrates example HARQ-processes in LTE uplink with TTI-bundling and combining across the HARQ-processes according to some example embodiments of the invention. In some example embodiments, code blocks from independent HARQ-processes (1) and (2), also (3) may be combined within the delay constraint. If the delay constraint is set for VoIP (50 ms convention), a maximum of 12 TTI-bundled HARQ-processes may be bundled, e.g. subframes 0 to 48. See for example, FIG. 5a where only six consecutive HARQ-events can be combined within this same delay constraint.

In some example embodiments, the access point 104 of FIG. 4, such as by the processor 120, the communications interface 124, the allocation module 126 or the like may be configured to receive the data payload (e.g. data packet replicas) in a transport block and decode the payload from consecutive TTI bundles of the same HARQ processes. The allocation module 126 may further be configured to combine and decode the replica payloads from the parallel HARQ processes across all of the received HARQ processes. In an instance in which the data payload from the consecutive bundles of the same HARQ processes are decoded and at least some of the replica payloads have been combined and decoded, by the access point 104, such as by the processor 120, the allocation module 126 or the like, then HARQ feedback may be transmitted to the communications device 102. In some example embodiments, the access point 104, such as by the processor 120, the communications interface 124, the allocation module 126 or the like may be configured to continue allocating identical Transport Blocks with identical Transport Format without a New Data Indicator (NDI) for the set of parallel HARQ processes.

Figure 8:
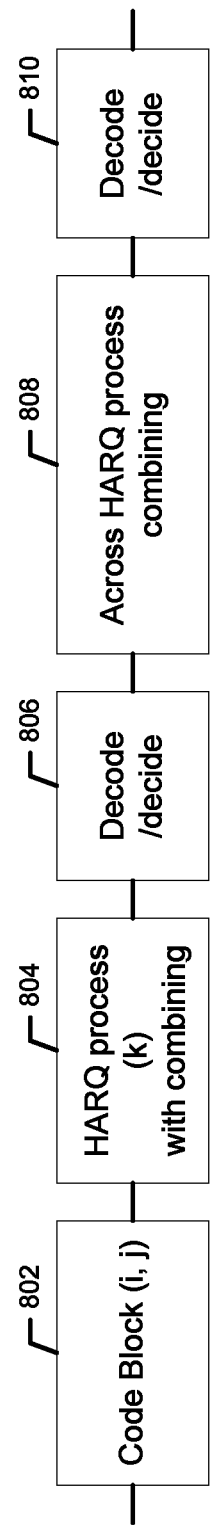
FIG. 8 illustrates an example flow diagram of example combining and decoding according to embodiments of the current invention.

FIG. 8 illustrates an example flow diagram of example combining and decoding according to embodiments of the current invention. As is shown in FIG. 8, a code block 802 may include an example Transport Block fed to parallel HARQ-processes (i). In some embodiments, the consecutive events of a single HARQ-process (j) are combined as long as their standalone decoding is not successful. See block 804. If the decoding is unsuccessful, combining across HARQ-processes may occur. See blocks 806 and 808. Despite of the number of retransmissions that for a single HARQ-process, after combining across HARQ-processes, decoding is attempted again at block 810.

Figure 9:
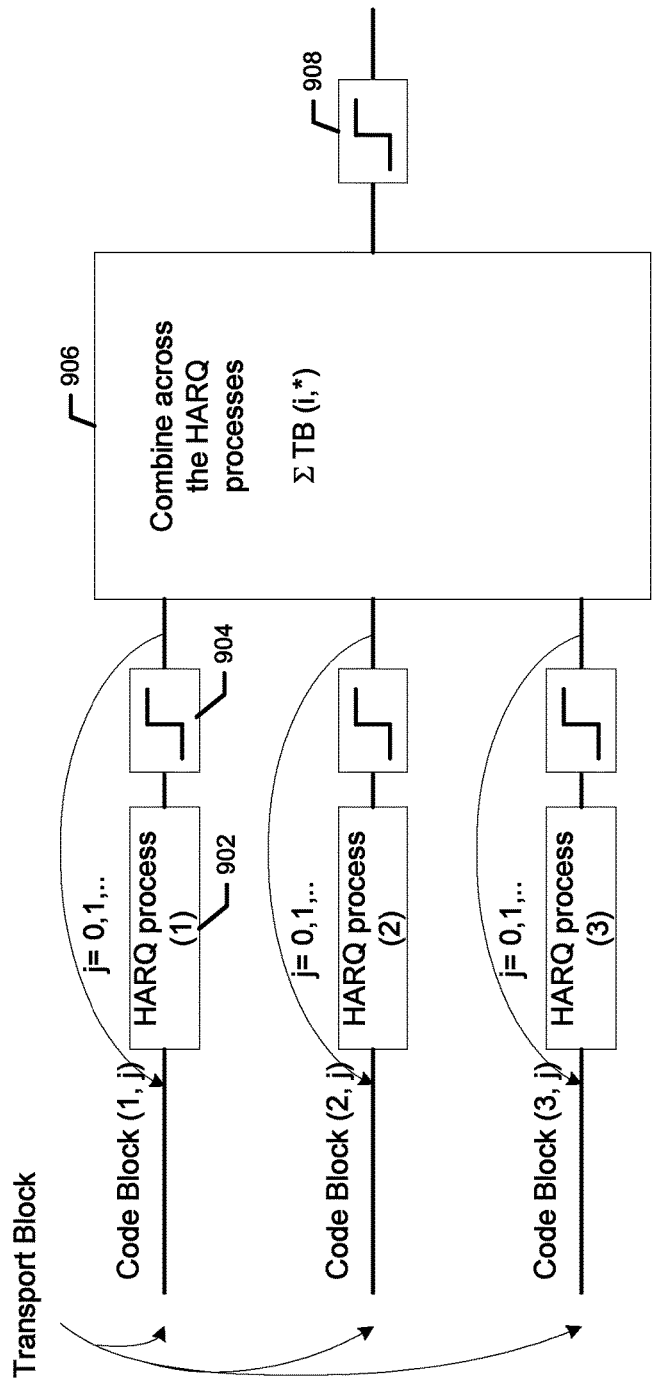
FIG. 9 illustrates an example block diagram of example combining and decoding according to embodiments of the current invention.

FIG. 9 illustrates an example diagram showing parallel HARQ process according to some example embodiments of the current invention. In particular FIG. 9 illustrates how the replica of a Transport Block is fed to the parallel HARQ-processes for retransmissions, combining and decoding. In in an instance in which a delay constraint is met and the decoding is still unsuccessful, the combination across HARQ-processes is executed and decoding is tried again, as is described herein.

In some example embodiments, the communications device 102, such as by the processor 110, the communications interface 114, the transport block transmission module 118 or the like, may continue to monitor the PDCCH and/or PHICH allocations of parallel HARQ processes, even if an allocation for one of the HARQ processes has been received and in an instance in which TTI bundling is active and it has data for a given logical channel. The communications device 102 may continue to transmit transport blocks with the data replicas to parallel HARQ process in an instance in which the Transport Block size and Format are the same, and there is no NDI present in the allocation. In some example embodiments, the data packets may be appended to the same Transport Block with a BSR.

Alternatively or additionally, in an instance of semi-persistent scheduling, a first new data allocation into a known set of candidate resources for each data packet may occur at periodic intervals. In such cases, semi-persistent allocation configurations and its activation are signaled by the access point 104 to the communications device 102 in, for example, an RRC-message. For semi-persistent allocations, the communications device 102 may not be configured to decode the PDCCH and may not deliver the BSR, but is configured to cause the data packets to be transmitted at known intervals to the known (semi-persistent) resources. By the agreed semi-persistent scheduling, the access point 104 may be configured to determine which resource candidates to attempt to decode for possible detection of the payload. In the case of a detected payload in a semi-persistent resource and incorrect decoding, the HARQ-process retransmissions may be signaled by the access point 104 to the communications device 102 via the PDCCH and/or PHICH.

Alternatively or additionally, semi-persistent allocations may be configured by RRC-signaling to the parallel HARQ-processes. In this case, the communications device 102 may transmit Transport Block replicas to the parallel semi-persistently allocated HARQ-processes. In an instance of incorrect-decoding, the data payloads across the HARQ-processes may be combined and then decoded.

FIG. 10 illustrates a flowchart according to an example method configured to be executed by a communications device for coverage enhancement of delay limited services. The operations illustrated in and described with respect to FIG. 10 may, for example, be performed by, with the assistance of, and/or under the control of one or more of the processor 110, memory 112, communication interface 114, or transport block transmission module 118. As is shown in operation 1002, the communications device 102, may comprise means, such as the processor 110, the communications interface 114, the transport block transmission module 118, or the like, for causing a short BSR to be transmitted to an access point in an instance in which a data packet arrived in a buffer. In an embodiment of the invention, BSR need not be transmitted with a payload. As is shown in operation 1004, the communications device 102, may comprise means, such as the processor 110, the communications interface 114, the transport block transmission module 118, or the like, for receiving an indication of allocated resources, wherein the allocated resources are configured to enable consecutive parallel HARQ process of bundled TTI and include an indication of a transport block size and transport block format. In some example embodiments, the allocation is received via at least one of a Physical Downlink Control Channel (PDCCH) or a Physical HARQ Indicator Channel (PHICH). As is shown in operation 1006, the communications device 102, may comprise means, such as the processor 110, the transport block transmission module 118, or the like, for generating one or more transport blocks, wherein the transport blocks are replicas and are configured to contain a data payload.

As is shown in operation 1008, the communications device 102, may comprise means, such as the processor 110, the communications interface 114, the transport block transmission module 118, or the like, for receiving an indication of a limited number of transmissions from an access point. This indication may have generated as a setting by a higher layer protocol well before the actual transmission, or may be generated at the time of transmission. Such indication may be omitted in an instance in which a limited number of transmissions is otherwise known, for example decided based on an implementation decision or derived from the bearer or data delay parameters. As is shown in operation 1010, the communications device 102, may comprise means, such as the processor 110, the communications interface 114, the transport block transmission module 118, or the like, for causing the transport blocks to be transmitted via parallel HARQ processes. In some example embodiments, the transport blocks are transmitted based on a limited number of transmissions. As is shown in operation 1012, the communications device 102, may comprise means, such as the processor 110, the communications interface 114, the transport block transmission module 118, or the like, for causing an allocation to be monitored, wherein the allocation comprises a transport block with a transport format and a new data indicator. As is shown in operation 1014, the communications device 102, may comprise means, such as the processor 110, the communications interface 114, the transport block transmission module 118, or the like, for causing transmission of the one or more transport blocks in an instance in which the allocation does not include a new data indicator and which includes a same transport block size and transport block format for the data payload replica. This differentiates from the conventional use of HARQ-processes, where a transport block with new data contents is transmitted on each parallel HARQ-process separately. A new data indicator (NDI) may be given every time, when a HARQ-process is initialized with new information contents of a payload.

FIG. 11 illustrates a flowchart according to an example method configured to be executed by an access point for coverage enhancement of delay limited services. The operations illustrated in and described with respect to FIG. 11 may, for example, be performed by, with the assistance of, and/or under the control of one or more of the processor 120, memory 122, communication interface 124, or allocation module 126.

As is shown in operation 1102, the access point 104, may comprise means, such as the processor 120, the communications interface 124, the allocation module 126, or the like, for receiving a short buffer status report (BSR) from a mobile terminal, in an instance in which the mobile terminal determined that a data packet arrived in a buffer operating on the mobile terminal. As is shown in operation 1104, the access point 104, may comprise means, such as the processor 120, the allocation module 126, or the like, for causing resources for the mobile terminal to be allocated. In some example embodiments, wherein the resources are configured to enable consecutive parallel HARQ process of bundled TTI and include an indication of a transport block size and transport block format. In some example embodiments, the allocation is transmitted via at least one of a PDCCH or PHICH.

As is shown in operation 1106, the access point 104, may comprise means, such as the processor 120, the communications interface 124, the allocation module 126, or the like, for causing an indication of a limited number of transmissions to be transmitted to a mobile terminal (e.g. communications device 102). In some example embodiments, the limited number of transmissions is determined based on at least one of a number of transmissions set by an EPS bearer delay constraint or a number of transmissions, until a next transport block with a new data payload is configured to be transmitted. As is shown in operation 1108, the access point 104, may comprise means, such as the processor 120, the communications interface 124, the allocation module 126, or the like, for receiving transport blocks via parallel HARQ processes. As is shown in operation 1110, the access point 104, may comprise means, such as the processor 120, the allocation module 126, or the like, for at least one of combing or decoding the transport blocks from consecutive TTI bundles of the same HARQ.

As is shown in operation 1112, the access point 104, may comprise means, such as the processor 120, the allocation module 126, or the like, for combining the one or more transport blocks from at least one of a plurality of parallel HARQ processes in an instance in which the transport blocks from consecutive TTI bundles of the same HARQ process were not decoded. As is shown in operation 1114, the access point 104, may comprise means, such as the processor 120, the allocation module 126, or the like, for decoding the one or more transport blocks from at least one of the plurality of parallel HARQ processes.

As is shown in operation 1116, the access point 104, may comprise means, such as the processor 120, the communications interface 124, the allocation module 126, or the like, for causing feedback to be sent to the communications device. As is shown in operation 1118, the access point 104, may comprise means, such as the processor 120, the allocation module 126, or the like, for causing a transport block with transport format without a new data indicator for the parallel indicators to be allocated. The method may, according to some example embodiments, also include causing feedback to be sent to a communications device in an instance in which at least some of the one or more transport blocks have been received but have not been successfully decoded.

FIGS. 10 and 11 illustrate example flowcharts of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 112, memory 122, volatile memory 40, or non-volatile memory 42) of a mobile terminal, server, or other computing device (e.g., the communications device 102, access point 104) and executed by a processor (e.g., the processor 110, the processor 120 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowcharts' block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowcharts' block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The various embodiments of the present invention provide many advantages over the current art. Some example embodiments do not require data packets to be segmented and thus there is no segmentation header overhead. The lack of Segmentation Headers allow more redundancy symbols be delivered in a given HARQ-event hence increasing the channel coding gain. Largest gains are obtainable from the combining across the parallel HARQ-processes, which increase the number of combinable blocks from 6 non-TTI-bundled blocks or 4 to 5 TTI-bundled blocks to 12 TTI-bundled blocks, when the delay constraint is 50 ms. Further example advantages include but are not limited to avoiding data packet (e.g. VoIP) payload segmentation, segmentation headers, increase channel coding symbols per code block, and/or the like.

Some example embodiments of the invention may improve coverage, robustness, reliability of transmission of a data payload. Some example embodiments of the invention may also, for example, avoid segmentation of a data payload and hence may allow a larger degree of redundancy of the payload. The combining of transmissions across parallel-HARQ processes may add soft symbol energy in the receiver, may add transmission diversity due to use of multiple resource units for the transmissions and may increase probability of successful decoding of one or more transport blocks in the data payload. Some example embodiments of the invention may at least improve coverage, reduce overhead and allow lower delay transport of a data payload.

The above described functions may be carried out in many ways. For example, any suitable means for carrying out each of the functions described above may be employed to carry out embodiments of the invention. In example embodiments, a suitably configured processor (for example, the processor 110 and/or processor 120) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 112 and/or memory 122), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:
1. A method comprising:
receiving an allocation of resources, wherein the allocation is configured to at least indicate consecutive parallel hybrid automatic repeat request processes of a transmission time interval bundle, wherein the consecutive parallel hybrid automatic repeat request processes include a plurality of different hybrid automatic repeat request processes;
generating one or more transport blocks, wherein the one or more transport blocks are configured to at least contain a data payload replica to be transmitted as the transmission time interval bundle; and causing the one or more transport blocks to be transmitted via the allocated consecutive parallel hybrid automatic repeat request processes as the transmission time interval bundle.

2. The method according to claim 1, further comprising:
causing a buffer status report to be transmitted to an access point in an instance in which a data packet for uplink is available in a buffer.

3. The method according to claim 1, further comprising:
causing transmission of the one or more transport blocks in an instance in which the allocation does not include an indication of new data and which includes a same transport block size and transport block format for the data payload replica.

4. The method according to claim 1, further comprising:
receiving an indication of a limited number of transmissions from an access point, wherein the limited number of transmissions is determined based on at least one of a number of transmissions set by an Evolved Packet System bearer delay constraint or a number of transmissions, until a next transport block with a new data payload is configured to be transmitted.

5. The method according to claim 1, further comprising:
causing the allocation to be monitored, wherein the allocation comprises a transport block with transport format and a new data indicator.

6. An apparatus comprising:
at least one processor; and
at least one memory including computer program code, the at least one memory and the computer program code configured to, with the at least one processor, cause the apparatus to at least:
receive an allocation of resources, wherein the allocation is configured to at least indicate consecutive parallel hybrid automatic repeat request processes of a transmission time interval bundle, wherein the consecutive parallel hybrid automatic repeat request processes include a plurality of different hybrid automatic repeat request processes;
generate one or more transport blocks, wherein the one or more transport blocks are configured to at least contain a data payload replica to be transmitted as the transmission time interval bundle; and
cause the one or more transport blocks to be transmitted via the consecutive parallel hybrid automatic repeat request processes as the transmission time interval bundle.

7. The apparatus according to claim 6, wherein the at least one memory including the computer program code is further configured to, with the at least one processor, cause the apparatus to at least:
cause a buffer status report to be transmitted to an access point in an instance in which a data packet for uplink is available in a buffer.

8. The apparatus according to claim 6, wherein the at least one memory including the computer program code is further configured to, with the at least one processor, cause the apparatus to at least:
cause transmission of the one or more transport blocks in an instance in which the allocation does not include an indication of new data and which include a same transport block size and transport block format for the data payload replica.

9. The apparatus according to claim 6, wherein the at least one memory including the computer program code is further configured to, with the at least one processor, cause the apparatus to at least:
receive an indication of a limited number of transmissions from an access point, wherein the limited number of transmissions is determined based on at least one of a number of transmissions set by an Evolved Packet System bearer delay constraint or a number of transmissions, until a next transport block with a new data payload is configured to be transmitted.

10. The apparatus according to claim 6, wherein the at least one memory including the computer program code is further configured to, with the at least one processor, cause the apparatus to at least:
cause the allocation to be monitored, wherein the allocation comprises a transport block with transport format and a new data indicator.

11. An apparatus comprising:
at least one processor; and
at least one memory including computer program code, the at least one memory and the computer program code configured to, with the at least one processor, cause the apparatus to at least:
cause resources to be allocated, wherein the allocation is configured to at least indicate consecutive parallel hybrid automatic repeat request processes of a transmission time interval bundle, wherein the consecutive parallel hybrid automatic repeat request processes include a plurality of different hybrid automatic repeat request processes;
combine one or more transport blocks from at least one of the plurality of different consecutive parallel hybrid automatic repeat request processes carrying the transmission time interval bundle, the transport blocks containing a data payload replica;
decode the one or more transport blocks from the at least one of the plurality of different consecutive parallel hybrid automatic repeat request processes; and
cause feedback to be sent to a communications device.

12. The apparatus according to claim 11, wherein the at least one memory including the computer program code is further configured to, with the at least one processor, cause the apparatus to at least:
receive a short buffer status report from the communications device, in an instance in which the communications device determined that a data packet arrived in a buffer operating on the communications device.

13. The apparatus according to claim 11, wherein the at least one memory including the computer program code is further configured to, with the at least one processor, cause the apparatus to at least:
indicate a limited number of transmissions, wherein the limited number of transmissions is determined based on at least one of a number of transmissions set by an Evolved Packet System bearer delay constraint or a number of transmissions, until a next transport block with a new data payload is configured to be transmitted.

14. The apparatus according to claim 11, wherein the at least one memory including the computer program code is further configured to, with the at least one processor, cause the apparatus to at least:
receive the one or more transport blocks via the consecutive parallel hybrid automatic repeat request processes.

15. The apparatus according to claim 11, wherein the at least one memory including the computer program code is further configured to, with the at least one processor, cause the apparatus to at least:
  cause a transport block with transport format without a new data indicator for the consecutive parallel hybrid automatic repeat request processes to be allocated.

\* \* \* \* \*